UNITED STATES PATENT OFFICE.

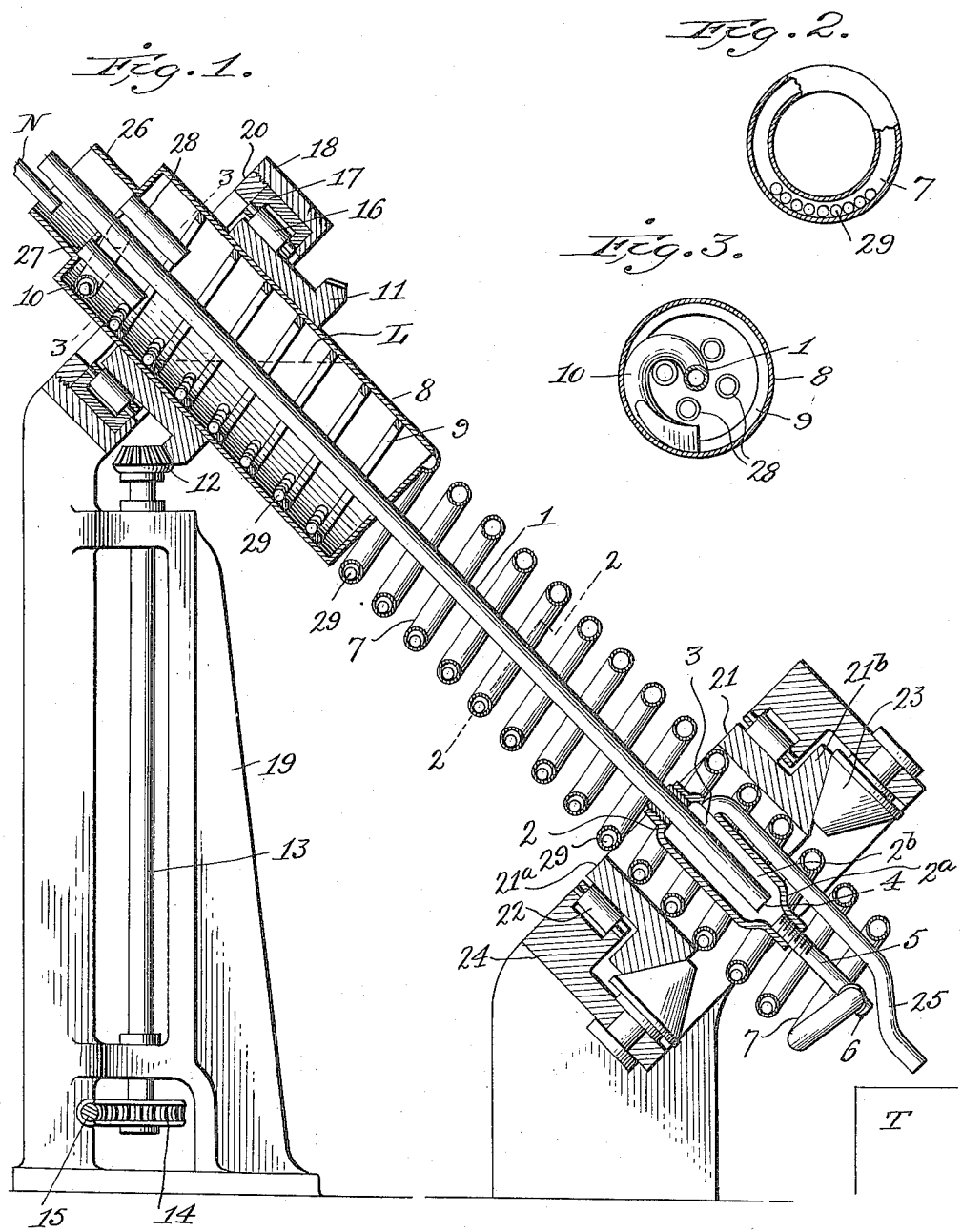

HARRY R. CONKLIN, OF JOPLIN, MISSOURI.

PRECIPITATING APPARATUS.

1,160,850.   Specification of Letters Patent.   Patented Nov. 16, 1915.

Original application filed April 7, 1915, Serial No. 19,823. Divided and this application filed June 26, 1915. Serial No. 36,526.

*To all whom it may concern:*

Be it known that I, HARRY R. CONKLIN, a citizen of the United States of America, residing at Joplin, in the county of Jasper and State of Missouri, United States of America, have invented certain new and useful Improvements in Precipitating Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, which is a division of my application Serial Number 19,823, filed April 7, 1915.

My invention relates to apparatus for forming precipitates from solutions containing metals by means of moving pieces of a solid precipitant, the apparatus being so constructed as to move all the solution successively past all the pieces of precipitant in succession, said pieces preferably moving in succession counter to the flow of liquid to be precipitated.

I am aware that it has been heretofore proposed to pass a cyanid solution containing gold and silver through a tube mill containing zinc balls or zinc balls in connection with a zinc lining, or to pass such a solution successively through a series of boxes or tanks containing zinc shavings and that it has also been proposed to supply finely comminuted zinc to the solutions which is carried along with the solution to settling tanks or filter presses where the precipitate is separated.

There is great objection from a practical standpoint to the use of a tube mill for the reason that there is a great deal of attrition, whereby particles of zinc are ground off and flow with the solution and precipitate, in suspension, to the filter, the precipitate containing considerable zinc and zinc oxid which requires removal to obtain good bullion.

The same objection applies to zinc shavings, the smaller particles of the shavings resulting from the continuous dissolving action of the solution, fall into the precipitate sludge and remain undissolved so that the sludge will have to be subjected to some treatment for the removal of zinc.

In using zinc dust there is considerable accumulation of zinc oxid as well as metal in the precipitate so that the removal of zinc again comes into question.

I have succeeded in eliminating metallic precipitant or its oxid, especially zinc or zinc oxid from the precipitate by causing the precipitant or pieces of the precipitant of considerable size to move in succession through the solution to be precipitated. I thus simplify present practice considerably, because no zinc metal is mixed with the precipitate and no special precautions have to be taken to exclude air from the precipitated solution after precipitation. I proceed preferably by using the precipitant in the form of solid round pieces or substantially such as cylinders or balls, and roll them through the solution, preferably through a counter current of the solution; these cylinders or balls preferably traveling in a closed circuit. The advantage of this is that there is little or no attrition or mechanical action on the moving pieces of precipitant to produce fines that may be entrained with the precipitate in the solution, and they are self clearing of the precipitate; the precipitate being removed preferably, but not necessarily from the field of action of the pieces of precipitant at or near the beginning of the advance portion of the circuit in which these pieces move. I prefer, however, to remove the precipitate from the path of movement of the pieces of precipitant by means of the flow of the solution. Another advantage is that when these pieces become so small that they cannot well be circulated in their circuit, they collect at the head or beginning of the current or flow of solution where the chemical action is most energetic and become dissolved, any precipitate formed by them being entrained by the current to the point of discharge of the solution.

The precipitate can be separated from the spent solution in any well known manner.

A suitable apparatus for carrying out the process above described is shown in the accompanying drawings in which like parts are similarly designated and in which:—

Figure 1 is a vertical longitudinal section, parts thereof being shown in elevation. Fig. 2 is a section on line 2—2 of Fig. 1. Fig. 3 is a section on line 3—3 of Fig. 1.

The apparatus shown is rotatable and is preferably mounted in an inclined position to facilitate the flow of solution through it, and is provided with suitable rotating means.

I provide a central longitudinal pipe 1 whose lower end is screwed into or otherwise connected to a casting 2 that is provided with a central tube 3 in alinement with and forming an extension of the pipe 1. This tube is preferably integral with the tube 1 as shown. This tube is provided with a suitable liquid outlet 4. The lower end of the portion 3 extends nearly to the reduced tubular end $2^a$ of the casting or discharge chamber 2 into the lower end of which is fastened a short pipe 5 closed by a removable plug 6.

The pipe 1, tube 3, reduced portion $2^a$ of the casting 2, and pipe 5, form a straight continuous passage or duct for the solid precipitant that connects at its lower end, namely, at the end of the short pipe section 5, with a worm or pipe spiral 7 surrounding the aforesaid straight pipe and preferably concentric with it. This spiral 7 communicates at its upper end with an inlet chamber 8, which surrounds the upper portion of pipe 1 and has an internal continuous rib 9 forming a continuation of the pipe spiral, preferably of the same pitch. The spiral rib terminates at the upper end of the inlet chamber 8 in a short spiral pipe 10 connecting with the pipe 1.

The inlet chamber 8 which is preferably cylindrical, has secured thereto a bevel wheel 11, driven by a bevel pinion 12 on a vertical shaft 13. The shaft 13 has a worm wheel 14 driven by worm 15 actuated from any suitable source of power.

The hub of the bevel wheel 11 rests on rollers 16 mounted in a bearing member 17 seated in a frame member 18 forming a portion of the casting or pedestal 19. The rollers and their bearing member 17 are locked in position in the frame member 18 by a ring 20.

The lower end of the worm pipe 7 is provided with a casting 21 having a cylindrical bearing $21^a$ movable on rollers 22, and a thrust bearing $21^b$ supported on rollers 23. The rollers 22 and 23 are mounted in a suitable support 24.

The casting 2 is provided with a chamber $2^b$ surrounding the tube 3. From the upper end of the chamber 2 extends a discharge pipe 25. In use, this pipe will discharge into any suitable receptacle as a tank T.

The upper end of the inlet chamber 8 is preferably but not necessarily reduced in cross section as at 26 which preferably has a closed bottom 27 provided with pipes 28 for carrying the solution beyond the spiral pipe 10 into the chamber 8. The spiral or worm pipe 7 and chamber 8 are provided with a solid precipitant in the form of pieces or balls 29.

The operation is as follows: Pieces of solid precipitant, preferably, but not necessarily zinc or aluminum balls 29 are introduced into the upper end of the pipe 1, and pass through the entire central conduit or pipe 1 into the lower turn of the worm pipe 7. Upon slowly rotating the machine in the proper direction, the balls 29 travel to the upper end of the spiral pipe 7 and discharge onto the continuous spiral rib 9. The supply of balls is continued until balls begin to feed through the short spiral pipe 10 back into the pipe 1 again. Solution to be precipitated is then supplied continuously through a pipe indicated at N to the portion 26, passes through the short pipes 28, beyond the pipe 10, into the chamber 8, spiral 7, short section of pipe 5, chamber $2^b$ of casting 2 and discharge pipe 25 to the tank T. The balls or pieces of precipitant 29 travel counter to the solution over a very long path. When the balls have been dissolved to such an extent by the solution, that they will not travel or transfer into the pipe 10, they remain in the chamber 8 and there the most intense dissolving action takes place, due to the action of fresh solution. When the pieces become so small that they cannot overcome the flow of the solution and are compelled to travel with it, they then pass with the solution into the spiral pipe and are caught by the advancing balls therein and become dissolved. Thus it will be seen that the pieces of precipitant are advanced without any grinding action on them; that the small pieces and fines are all advanced to the upper inlet end of the machine, and small particles are trapped by the advancing balls so that no zinc will enter the precipitate and the precipitate will be continuously discharged with the solution through pipe 25.

I claim—

1. Apparatus for precipitating substances from solutions, which comprises means forming a closed circuit for pieces of solid precipitant and having an advancing and a return portion, means for passing a counter current of a solution containing a substance capable of being precipitated by said precipitant and a collector for the pieces too small for mechanical transfer to the return portion of said circuit, said collector arranged at a point between said advancing and return portions.

2. Apparatus for precipitating substances from solutions, which comprises means forming a closed circuit for moving solid pieces of a precipitant and having an advancing and return portion, means for supplying a solution of a substance capable of being precipitated over said pieces and counter thereto, means for transferring the pieces from the solution at the end of said advancing portion and delivering them to said return portion and collecting means for the pieces too small for mechanical transfer arranged at the beginning of said counter current.

3. Apparatus for precipitating substances from solutions, which comprises means forming a closed circuit for moving solid pieces of a precipitant and having an advancing and a return portion, means for supplying a solution of a substance capable of being precipitated over said pieces and counter thereto, means for mechanically transferring the pieces from the solution at the end of said advancing portion and delivering them to said return portion, collecting means for the pieces too small for mechanical transfer at the beginning of said counter current, and means for discharging the precipitate from the path of movement of the pieces near the beginning of said advancing portion.

4. In a precipitating apparatus, in combination a conduit having a spiral continuation parallel therewith, means to supply solution to be precipitated to said spiral continuation, and means to transfer solid precipitant from the end of said spiral continuation to said conduit, liquid discharge means for said spiral continuation, and means to rotate the combination.

5. In a precipitation apparatus in combination, a conduit having a spiral continuation substantially parallel therewith, means near the inlet of the conduit to transfer pieces of precipitant from said spiral continuation to said conduit, means near said transfer means to supply solution to be precipitated to said spiral, liquid discharge means arranged to discharge spent solution and precipitate, and means to rotate the combination.

6. In a precipitation apparatus, in combination a substantially straight conduit having a concentric spiral continuation, means to transfer solid precipitant from the end of the spiral continuation to said straight conduit, means below said transfer means to supply solution to be precipitated to the spiral, liquid discharge means between said straight and spiral portions, and mechanism to rotate the combination.

7. In a precipitating apparatus in combination, a substantially straight pipe, a concentric spiral continuation thereof, a chamber for the solution to be precipitated concentric with said straight pipe and communicating with said spiral, mechanism in said chamber to transfer pieces of solid precipitant from said spiral to said straight pipe, liquid discharge means at the end of said straight pipe, and mechanism to rotate the combination.

8. In a precipitating apparatus, in combination a substantially straight inclined pipe, a spiral continuation surrounding said pipe, a chamber for the solution to be precipitated surrounding said straight pipe communicates with said spiral at the discharge end of the latter, means in said chamber to transfer solid precipitant from said spiral to said straight pipe, liquid discharge means arranged to discharge spent solution, and means to rotate said combination.

9. In a precipitating apparatus, the combination with a substantially straight inclined pipe, a discharge chamber connected to the lower end thereof, a spiral pipe surrounding said straight pipe and connected to said discharge chamber for the solution to be precipitated, a chamber surrounding the straight pipe and communicates with said spiral pipe, a spiral rib in said chamber forming a continuation of said spiral pipe, and means in said chamber connected to said straight pipe to guide pieces from said rib to said straight pipe, and means to rotate the combination.

10. In a precipitating apparatus the combination, with a substantially straight inclined pipe, a discharge chamber connected to the lower end of said pipe, a spiral pipe concentric with said straight pipe and chamber connected to said chamber for the solution to be precipitated, a chamber surrounding the upper portion of said straight pipe and communicates with said spiral pipe, a spiral rib in said chamber forming a continuation of said spiral pipe, a short spiral pipe rigidly connected to the straight pipe near its upper end and arranged to receive solids from said rib, a discharge pipe connected to said discharge chamber at a point above the extreme end of said straight pipe, and means to rotate the combination.

11. In a precipitating apparatus, in combination, a substantially straight inclined pipe, a spiral pipe surrounding the same, a discharge chamber forming a connection between the two pipes, a chamber at the upper end of said straight pipe in which said spiral pipe terminates, means in said chamber to transfer solid pieces from said spiral pipe to said straight pipe, a liquid inlet for said chamber having one or more short pipes discharging into said chamber at a point below its top and means to rotate the combination.

In testimony that I claim the foregoing as my invention, I have signed my name in presence of two subscribing witnesses.

HARRY R. CONKLIN

Witnesses:
 H. A. FISCHER,
 H. M. RAMSEY, Jr.